United States Patent Office 3,347,764
Patented Oct. 17, 1967

3,347,764
METHOD OF PRODUCING POLYOXYMETHYLENE USING TRIOXANE, A SOLVENT AND IONIZING RADIATION
Toyokazu Matsumoto, Miyakojima-ku, Osaka, Saburo Ohara, Sakyo-ku, Kyoto, Shigeru Kawase, Mishima-gun, Osaka, and Hisako Sakurai, Fuse, Japan, assignors to Kanegafuchi Spinning Co., Ltd., Tokyo, Japan
No Drawing. Filed Mar. 9, 1962, Ser. No. 178,546
Claims priority, application Japan, Mar. 16, 1961, 36/9,555
2 Claims. (Cl. 204—159.21)

This invention relates to a method for producing a high molecular weight material by the polymerization of trioxane, and more particularly to a method for producing high molecular weight formaldehyde polymers or polyoxymethylenes by the ring-opening-polymerization of trioxane in the solid state with the utilization of ionizing radiation.

It is well known that trioxane may be polymerized through ring-opening or ring cleavage in the presence of a certain catalyst such as an inorganic fluoride, e.g., antimony trifluoride or boron fluoride, a coordinate complex of water with boron fluoride, or a coordinate complex of boron fluoride with an organic compound in which oxygen or sulfur is the donor atom, to produce a tough, high molecular weight polymer known as polyoxymethylene or formaldehyde polymer. As typical examples of the conventional catalytic polymerization processes may be mentioned U.S. Patent Nos. 2,989,506 and 2,989,511.

These conventional methods of catalytic polymerization of trioxane, however, have various drawbacks. For example, the nature of the catalyst is quite critical and limited. Thus, many metallic fluorides such as lead fluoride, ferric fluoride, etc. do not show catalytic activity. Furthermore, the catalyst employed must be removed from the resulting polymerization product. A troublesome operation is required for this removal and it is very difficult to completely remove the catalyst.

It is an object of this invention to provide a novel and effective process for producing a tough, high molecular weight material or polyoxymethylene from trioxane without employing a catalyst which incurs troublesome procedure for removal thereof after polymerization.

It is another object of this invention to provide a novel and effective process for producing a tough, high molecular weight material or polyoxymethylene from trioxane without employing a catalyst as mentioned above but utilizing ionizing radiation.

It is still another object of this invention to provide a novel and effective process for producing a tough, high molecular weight material or polyoxymethylene from trioxane in a solid state without melting the reactant and without requiring a liquid medium.

Other objects, advantages and features of this invention will be apparent from the following detailed explanation.

It has unexpectedly been found that when trioxane in solid state is subjected to irradiation of ionizing radiation and then heated to an increased temperature, there occurs polymerization of trioxane through ring cleavage or ring opening to produce a tough, high molecular weight polymer or polyoxymethylene in a good yield.

It is well known that certain monomeric materials, such as acrylamide, vinyl-β-naphthalene, vinylcarbazole, formaldehyde, hexamethylcyclotrisiloxane, may be polymerized in solid state when subjected to irradiation of ionizing radiation. As well known, the common feature of known radiation induced polymerization is in that the polymerization proceeds exclusively on radical polymerization mechanism and not ionic polymerization mechanism. It is also known that a post-polymerization after the irradiation is observed in case of radical polymerization, while not in ionic polymerization. Furthermore, it is known that, generally, a radical polymerization of irradiated monomer proceeds at a relatively low temperature and not at an increased temperature.

Unexpectedly, we have found that irradiation of ionizing radiation is effective in the polymerization of trioxane which is believed to be an ionic reaction and not a radical reaction. It is well known that trioxane can be polymerized in the presence of a catalyst only in an ionic nature. This fact shows that the ring-opening-polymerization of trioxane would be based on ionic polymerization. Apparently, the reaction mechanism of the ring-opening-polymerization of trioxane is of the ionic type and not the radical type. In fact, trioxane was subjected to irradiation of ionizing radiation and thereafter tested by E.S.R. but no evidence of radicals could be noticed. However, there was observed a decrease in the intrinsic resistance on the irradiated trioxane. Furthermore, the irradiated trioxane could be easily copolymerized with styrene. These facts well show that the ring-opening-polymerization of trioxane in solid phase is an ionic reaction and not a radical reaction.

Another unexpected finding is that trioxane is not broken into fractions but the ring is opened to form a single chain ($-$O$-$CH$_2$$-$O$-$CH$_2$$-$O$-$CH$_2$$-$) which can be polymerized into polyoxymethylene. Still another unexpected finding is in that post-polymerization of irradiated trioxane is more effective at an elevated temperature (near but below the melting point of trioxane) in contrast to known radiation induced radical polymerization.

In general, the process of this invention is carried out by subjecting solid trioxane to irradiation of ionizing radiation at a temperature below the melting point of the trioxane employed, and then heating the irradiated reaction mass to a temperature between 50° C. to 60° C. until the desired polymerization is completed. After the polymerization the product is heated to remove unreacted trioxane.

When solid trioxane is irradiated with high energy ionizing radiation to open the trioxane ring for polymerization, the polymerization yield is increased as the total radiation dose increases. The yield also increases as the temperature at which the irradiation is effected is increased. In both cases, however, the formed polymer is degradated due to the increased high energy and/or increased temperature. Therefore the temperature at which the irradiation is effected and the radiation dose should be suitably selected.

We have found however that when solid trioxane is irradiated the energy is held in the solid even after the irradiation is terminated. We have further found that when the so irradiated or energized trioxane is heated to a temperature near but below the melting point thereof the molecular movement is activated and the ring cleavage polymerization of trioxane is promoted so that high molecular weight polymer is produced. This thermal energy applied after the irradiation is smaller than that required to degradate the formed polymer and this is the reason why an excellent high molecular weight polyoxymethylene is produced accordingly to this invention.

According to the method of this invention polyoxymethylenes having an inherent viscosity of 0.8–2.0 as measured at 60° C. as 0.5% solution thereof in p-chlorophenol containing 2% by weight of alpha-pinene. The chemical structure or formula of such polyoxymethylene or formaldehyde polymer is well known in the art. Its utility is also well known and no detailed explanation would be necessary.

In carrying out the present invention any commercial trioxane (M.P. 60–62° C.) may be employed, although pure trioxane (M.P. 64° C.) may be also used. The only requirement is that trioxane must be employed in solid state and not in molten state. Trioxane should not be used in the form of solution or suspension so that no liquid medium or solvent is required. Commercial trioxane is in the form of small crystals, average particle or crystal size being less than about 3 cubic mm. It has been found, however, that a better result is obtained in respect of yield and polymerization velocity when trioxane of a larger crystal size is subjected to irradiation according to this invention. Such a large crystalline trioxane may be prepared, for example, by melting commercial trioxane in small crystalline size as mentioned above and then slowly cooling the molten mass. By this procedure a large block crystal of trioxane is obtained. Thus, it is preferable, although not essential, to use trioxane in the form of large crystals, average crystal size being larger than about 5 cubic mm.

It has also been found that when trioxane is irradiated in the presence of a small amount of a halogenated hydrocarbon chain compound the polymerization reaction is promoted and polyoxymethylene of a higher molecular weight is obtained in a better yield. Any of mono-, di-, tri- or polyhalogenated hydrocarbon chain compounds which can be solvents for trioxane may be employed. Typical examples are chloroform, carbon tetrachloride, methylene dichloride, ethylene dichloride, etc. The amount of such halogenated aliphatic hydrocarbon should be so small that trioxane would be not dissolved thereby. Generally, the halogenated aliphatic hydrocarbon is employed in an amount of 0.1–10% by weight based on the amount of trioxane. The hydrocarbon compound may be added to and mixed with trioxane in any suitable manner. One convenient procedure is to spray the hydrocarbon compound in mist onto trioxane mass while agitating the latter, so that the surfaces of the trioxane crystals will be coated or wet with the liquid hydrocarbon. Alternatively, trioxane is heated to a molten body and a mixture of the molten trioxane and a suitable amount of the halogenated hydrocarbon is cooled to be crystallized so that the hydrocarbon is contained in the trioxane crystals.

The halogenated aliphatic hydrocarbon promotor of this invention may be readily removed from the polymerization product by a simple operation such as distillation or heating, in contrast to known catalytic polymerization of trioxane where removal of the catalyst is troublesome and the catalyst tends to remain in the polymer as an impurity which adversely affect the product.

In irradiating trioxane in solid state, any known ionizing radiation may be employed, inclusive those obtained or liberated from such sources as Van de Graaff, betatron, synchrotron, cyclotron, dynamitron, linear accelerator; atomic reactor, radioactive isotope, and other natural and artificial radioactive materials. Electromagnetic rays, known as gamma rays, such as can be obtained from $Co^{60}$ and X-rays produced upon collision of energy-carrying electrons with a metal target.

The suitable radiation dose to be employed in carrying out this invention will depend upon the properties desired in the product and also upon the temperature under which the irradiation is effected.

Generally, at a temperature below 0° C. no noticeable polymerization of trioxane occurs during the irradiation. However, at a temperature above 0° C. and up to the melting point of trioxane, the polymerization proceeds during the irradiation and the rate of polymerization is increased but the inherent viscosity of the polymer is decreased as the radiation dose is increased. Thus, for example, when trioxane is irradiated in the total dose of $5 \times 10^5$ r. at 30° C. the polymerization yield at the end of the irradiation is less than 5% but the inherent viscosity of the polymer is 1.2, whereas if the total radiation dose is increased up to $5 \times 10^6$ r. the polymerization yield at the end of the irradiation becomes more than 10% but the inherent viscosity of the polymer is lowered to 0.5. Similarly, between 0° C. and the melting point of trioxane, the rate of polymerization is increased but the inherent viscosity of the polymer at the end of the irradiation is decreased as the temperature increases. Thus, for example, when the same is irradiated in the total radiation dose of $5 \times 10^5$ r. at 50° C. the polymerization yield at the end of the irradiation is about 25% but the inherent viscosity of the polymer is 0.8 or less. In any case, however, when the irradiated trioxane is subjected to the post-polymerization as detailed later, the polymerization proceeds satisfactorily.

In order to avoid loss of trioxane by sublimation during the irradiation the temperature should be as low as possible. At a low temperature such as below 0° C. no sublimation of trioxane occurs during the irradiation. No noticeable polymerization of trioxane occurs at such a low temperature, but a satisfactory polymerization can be effected as the post-polymerization. An extremely low temperature such as a temperature below −30° C. or even below −50° C. may also be used for the irradiation.

It will be understood therefore that the radiation dose and temperature are correlated and may be suitably selected depending upon the properties desired in the product and also taking the economy into consideration. Generally, a temperature below the melting point of trioxane and a total radiation dose of $1 \times 10^5$–$5 \times 10^6$ r. may be employed for the irradiating operation.

After the pre-irradiation the trioxane is subjected to post-polymerization. In order to avoid loss of active centres formed by the irradiation, it is preferable to subject the irradiated trioxane as quickly as possible after the irradiation. However, the irradiated trioxane can be stored for a long time (e.g. one week) if maintained at a low temperature such as below −30° C. without loss of the active centres.

The post polymerization is carried out by heating the irradiated trioxane at an increased temperature but below the melting point thereof. Preferably, a temperature between 50° C. and 60° C. is employed, a temperature of 55° C. being optimum. Preferably, the post-polymerization is carried out in a closed vessel or chamber in order to avoid sublimation of trioxane. The time required for the post-polymerization varies depending upon the amount of the reaction mass and the conditions of the pre-irradiation. Generally, the irradiated trioxane is heated at a temperature between 50° C. and 60° C. in a closed chamber for more than 20 minutes, preferably from 30 minutes to one hour.

After the post-polymerization the product is heated to remove unreacted trioxane by sublimation or distillation. The recovered trioxane may be reused for the polymerization. The method of this invention is economical accordingly. If a halogenated hydrocarbon compound is used as the promotor, it may be removed or recovered also by subjecting the polymerization product to heating or distillation.

Polyoxymethylenes thus obtained according to this invention are tough and high molecular polymers (inherent viscosity being 0.8–2.0). Since no catalyst is employed the polymeric product is substantially pure.

The polymer obtained accordingly to this invention may be used in molding or fabricating various articles in a conventional manner known in the art of molding or fabrication of conventional polyoxymethylene or formaldehyde polymer articles. Thus, for example, the polymer of this invention may be compression molded at a temperature of from 190° C. to 200° C. for a few minutes to produce tough, molded articles.

The following examples are given by way of illustration. In these examples, all parts are by weight. Throughout the specification including the following examples and claims, inherent viscosities were measured at 60° C. in a 0.5% solution of each polymer in p-chlorophenol containing 2% by weight of alpha-pinene.

Example 1

To 100 parts of commercial crystalline trioxane were added 8 parts of ethylene dichloride by spraying the ethylene dichloride ($CH_2Cl=CH_2Cl$) onto the trioxane mass while being stirred. Thereafter the mixture was irradiated with gamma radiation from $Co^{60}$ at 25° C. After irradiation (total radiation dose $5 \times 10^5$ r.), the reaction mass was placed in a closed reaction vessel and held at a temperature of 55° C. for 30 minutes. Then, unreacted trioxane and methylene dichloride were recovered by subjecting the resulting polymerization product to distillation at 115° C. There were obtained 50 parts of polyoxymethylene in the white fibrous form. The inherent viscosity of this polymer was 1.1. The polymer was compression molded at 190° C. to form a tough film. The recovered unreacted trioxane could be polymerized in a similar manner to produce a similar polymer.

Example 2

100 parts of commercial crystalline trioxane were heated to 90° C. to be a molten body. The molten body was poured in a mould and slowly cooled to 0° C. to form a plate consisting of large crystalline trioxane. The sheet was subjected to energy irradiation from a Van de Graaff accelerator at 0° C. The total radiation dose was $5 \times 10^5$ r. At the end of the irradiation no polymerization was observed. Then the irradiated plate was heated at 58° C. for 30 minutes within a closed chamber. There were obtained 50 parts of white polyoxymethylene having an inherent viscosity of 1.2.

Substantially same result was obtained by repeating the above procedure except that the irradiation was carried out at −78° C.

Example 3

100 parts of commercial crystalline trioxane were heated to 80° C. and the resulting molten mass was slowly cooled to room temperature to obtain a large crystal mass. The mass was subjected to irradiation of gamma radiation from $Co^{60}$ as the radiation source. During the irradiation the temperature was held at −30° C. The total radiation dose was $5 \times 10^5$ r. The mass was placed in a closed vessel and heated at a temperature of 55° C. for 45 minutes. By heating the resulting product at a higher temperature to recover unreacted trioxane by sublimation. There were obtained 67 parts of white polymethylene having an inherent viscosity of 1.0.

What we claim is:

1. A process for preparing polymeric material which comprises subjecting trioxane to irradiation of ionizing radiation at a temperature lower than 30° C., the trioxane in solid state and with a total radiation dose of $1 \times 10^5$ to $5 \times 10^6$ r. in the presence of a halogented aliphatic hydrocarbon in an amount of 0.1 to 10 parts by weight based on the amount of the trioxane, and then holding the irradiated reaction mass at a temperature of from 50° to 60° C. for more than 30 minutes.

2. A method of producing polyoxymethylene which comprises subjecting a mixture to ionizing radiation at a temperature of below 30° C. and heating the irradiated product at a temperature between 50° and 60° C., the mixture containing from about 0.1 to about 10 parts by weight of halogenated aliphatic hydrocarbon solvent per 100 parts by weight of solid trioxane.

References Cited

UNITED STATES PATENTS

| | | | |
|---|---|---|---|
| 2,512,950 | 6/1950 | Londergan | 260—67 |
| 2,940,912 | 6/1960 | McKusick | 204—154 |
| 2,948,666 | 8/1960 | Lawton | 204—154 |
| 2,964,455 | 12/1960 | Graham | 204—154 |
| 2,989,505 | 6/1961 | Hudgin et al. | 260—67 |
| 2,989,508 | 6/1961 | Hudgin et al. | 260—67 |
| 3,027,352 | 3/1962 | Walling et al. | 260—67 |
| 3,093,560 | 6/1963 | Fourcade | 204—154 |

FOREIGN PATENTS 871,298   6/1961   Great Britain.

OTHER REFERENCES

Okamura et al., Radiation Induced Polymerization of Trioxane, Isotopes and Radiation, vol. 3, No. 5, 1960, pp. 416–418.

Fadner et al., Polymerization in the Crystalline State, Journ. of Polymer Science, vol. XLV, pp. 475–501, 1960.

Magat, Sur les Polymerisations Ioniques, Die Makro Chemie, vol. 35, pp. 159–171, 1960.

MURRAY TILLMAN, *Primary Examiner.*

RICHARD TURER, N. F. OBLON, *Assistant Examiners.*